Patented Mar. 11, 1941

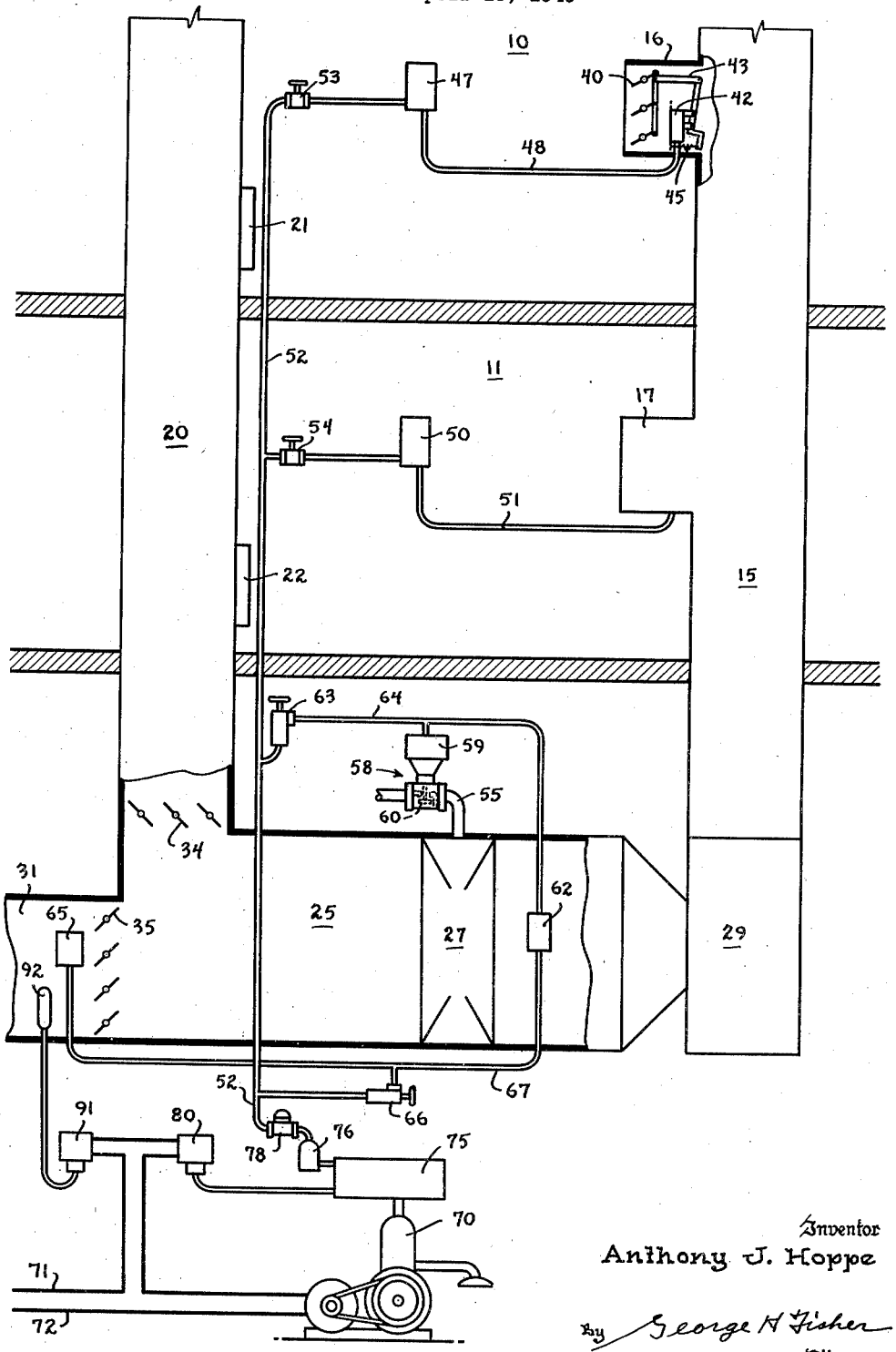

2,234,633

UNITED STATES PATENT OFFICE 2,234,633

AIR CONDITIONING SYSTEM

Anthony J. Hoppe, Detroit, Mich., assignor to Minneapolis-Honeywell Regulator Company, Minneapolis, Minn., a corporation of Delaware Application April 19, 1940, Serial No. 330,539

7 Claims. (Cl. 236—1)

The present invention relates to air conditioning systems and more particularly to a system for heating and ventilating a plurality of zones.

One of the objects of the invention is to provide a system which will automatically provide ventilation during warm weather to a plurality of zones the temperatures of which are individually controlled when heating is required.

Another object is to provide a pneumatic control system for regulating the amount of heated air supplied to a plurality of zones with means to shut down the air compressor when no heat is needed, the various motors for controlling heating and ventilating being arranged so that lack of control air pressure will result in positioning the controls so that the zones will be ventilated.

Other objects of the invention will be apparent from the following description and claims.

The single figure of the drawing shows an air conditioning system embodying the present invention.

In the illustrative embodiment of the invention a steam coil heats the air which is passed to the several zones. This steam coil is provided with a "reverse acting" steam valve which acts to close when the control air pressure applied thereto is reduced. Zone dampers of the "direct acting" type are also provided which close when increased control air pressure is applied to their damper motors. An outside thermostat is wired into the power supply circuit of the air compressor motor which supplies the control air and serves to stop the compressor when outside temperature rises to a value at which no heat is required for the building. Therefore, when the weather is warm the air compressor is prevented from operating so that the control air pressure will be dissipated thus causing the steam valve to close and the zone dampers to open thereby providing ventilation to the various zones.

The present system is shown as supplying air to two zones 10 and 11 the temperatures of which are to be separately controlled during the heating season. Air is supplied to zones 10 and 11 through a supply air duct 15 which has an outlet 16 into zone 10 and an outlet 17 into zone 11. A return air duct 20 serves to convey air away from the zones and is provided with an opening 21 leading from zone 10 into this duct and an outlet 22 from zone 11. It will be understood that any number of zones can be supplied with air by duct 15 and these additional zones could also be served by return air duct 20. A chamber 25 outside of these zones is equipped with a heating coil 27 which is adapted to heat all the air passing through this chamber. Air passing from the chamber 25 enters a centrifugal fan 29 which serves to force air through the duct 15 and into the various zones. Chamber 25 is supplied with air from the return air duct 20 and is also supplied with air from a fresh air inlet duct 31. Dampers 34 and 35 located in the return air duct 20 and the fresh air duct 31, respectively, may be set to proportion the amounts of fresh and return air supplied to the chamber 25. These dampers may be controlled manually, or may be controlled automatically in any suitable manner.

The outlets 16 and 17 from the supply air duct 15 are provided with volume dampers for controlling the temperatures in the individual zones. A damper 40 is located in the outlet 16 to zone 10 and is positioned by a pneumatic damper motor 42. This damper motor is connected by a link 43 to the damper 40 so that increased air pressure within the motor 42 will serve to close the damper 40. A spring 45 serves to open the damper 40 when pressure of the control air is reduced. It is desirable to provide a stop (not shown) to limit closure of the damper 40 so that some ventilation will always be provided. A similar damper is positioned within the outlet 17 leading to zone 11.

A zone thermostat 47 normally determines the control air pressure supplied through an air line 48 to the damper motor 42. Likewise, the thermostat 50 located within zone 11 normally determines the air pressure supplied through an air line 51 to the damper motor located within the outlet 17. Compressed air at a suitable pressure is supplied from a supply main 52 through an adjustable restriction 53 to the thermostat 47. The thermostat 47 may be of the "bleed" type or "non-bleed" type and vents the air line 48 leading to the damper motor 42 to a' .nosphere at temperatures below its control settin". The restriction 53 is so set with respect to the maximum bleed of the thermostat that the pressure in the pipe beyond the restriction and in the damper motor 42 may be controlled by the thermostat between substantially zero gage pressure and the available pressure in the supply main 52. In this way high zone temperature results in relatively high pressure in the damper motor 42 which causes the damper 40 to move toward closed position. The thermostat 50 in zone 11 is supplied with compressed air from the main 52 through a restriction 54 and operates to control the supply of air to this zone in the same way the thermostat 47 controls the supply of air to zone 10 as described above.

A steam supply pipe 55 is connected to any suitable source of steam and leads to the steam coil 27 located within the chamber 25. Supply of steam through the pipe 55 is controlled by a pneumatically operated valve 58. This valve is of the "reverse acting" type in which reduced control air pressure within the diaphragm chamber 59 will result in closing a valve disc 60 against its seat.

The steam valve 58 is under the control of a thermostat 62 located in the chamber 25 on the discharge side of the steam coil 27. Compressed air is supplied from the main 52 to the valve 58 and the thermostat 62 through an adjustable restriction 63 and an air line 64. The restriction 63 is set to supply compressed air at a small rate. The thermostat 62 bleeds air from line 64 at a rate depending on the temperature of the air discharged from the steam coil 27. Upon rise in temperature this thermostat acts to increase the rate of bleed from line 64, thereby reducing the pressure in the diaphragm chamber 59 of the valve 58 and moving the valve disc 60 toward closed position. Upon fall in temperature less air is bled from the line 64 so that air passing through the restriction 63 will build up the pressure in the diaphragm chamber 59 to open the valve.

The thermostat 62 is of the type known in the art as a "submaster" thermostat. This type of thermostat is provided with a diaphragm responding to pressure in an air line such as 67, this diaphragm serving to vary the control point of the instrument in accordance with the pressure in this control line. In this case the control point is determined by a thermostat 65 located in the fresh air duct 31. The thermostat 65 and control line 67 are supplied with compressed air from the supply main 52 through an adjustable restriction 66. The thermostat 65 is adjusted to bleed the line 67 at a maximum rate at an outdoor temperature high enough so that no heating is required. The amount of bleed is reduced upon fall in temperature until at an outdoor temperature at which maximum heating may be required no bleeding takes place and the pressure within the line 67 and the adjusting diaphragm of thermostat 62 is at a maximum. Thus the temperature of the air being discharged from the steam coil 27 is determined by outdoor temperature, being high at relatively low outdoor temperatures and low at relatively high outdoor temperatures. In this way adequate ventilation of the various zones is assured since the zone thermostats will position their accompanying dampers relatively wide open in order to maintain the temperature within the zones for which the thermostats are set.

A conventional air compressor 70 is supplied with electric power by the lines 71 and 72. An air receiver 75 is supplied with compressed air by the compressor 70 at a relatively high pressure. Air passes from the receiver 75 through an air cleaner 76 and a reducing valve 78 which normally maintains the pressure of the control air to the various control units at the desired pressure, for instance 15 pounds per square inch. A pressure control 80 is placed in series with the power supply line 71 to the compressor 70 for maintaining a pressure within the receiver 75 at some pressure above the control line pressure such as 30 pounds per square inch. The reducing valve 78 supplies control air to the control air supply main 52 heretofore mentioned.

A thermostat 91 is also wired into the compressor motor circuit and has a temperature responsive bulb 92 located within the fresh air duct 31 so that it will be responsive to outdoor air temperature. The thermostat 91 is so adjusted that at an outdoor temperature at which no heating is required for the various zones, the circuit to the compressor motor will be opened.

The operation of this system is as follows: when the outdoor temperature is sufficiently low so that heating is required the steam valve 58 will be positioned by the thermostat 62 and secondarily by the thermostat 65 to supply the steam coil 27 with sufficient steam to heat the air delivered to the zones 10 and 11 an amount such that the dampers controlling the amount of air delivered to the various zones will be opened relatively wide.

Normally the thermostats 47 and 50 will position their associated dampers to maintain the temperature within the zones substantially constant. It will be understood that as the outdoor temperature rises to the value at which very little heating is required the steam valve 58 will be moved towards closed position. When the steam valve 58 is completely closed and the zone temperatures are still above the thermostat settings, the volume dampers controlling the air in the various zones will be moved to closed position. While this is desirable in order to maintain the temperature within the zones at the desired value it also results in greatly reducing the amount of ventilation supplied to these zones. The thermostat 91 which is responsive to outdoor temperature and controls operation of the compressor motor serves to stop the compressor when the outdoor temperature is so high that heating is no longer required. The pressure built up in the receiver 75 and the various pneumatic control devices and their air supply lines will then be dissipated through the bleed ports of the various thermostats until this pressure is depleted. This will result in loss of control air pressure within the damper motor 42 and other similar damper motors so that the spring 45 will open the damper 40. The fan 29 will then supply air through the duct 15 to the zones 10 and 11 providing suitable ventilation. Since the steam valve 58 is of the "reverse acting" type, reduction in control air pressure caused by stopping the compressor 70 will result in this valve remaining closed.

Thus it will be seen that the various zones are supplied with heated air of a sufficient temperature and volume to maintain these zones at the desired temperatures when heat is required and that the dampers to these zones are automatically opened to supply air for ventilation purposes when the outdoor temperature is high enough so that no heating is required. Various other means could be employed to obtain the desired result. For example, instead of stopping the compressor, thermostat 91 could actuate a three-way valve to vent the pipe 52 and at the same time close the discharge from the receiver 75.

It is to be understood that the system described is illustrative only and that the scope of the invention is to be determined only by the appended claims.

I claim as my invention:

1. In a pneumatically controlled zone air conditioning system, in combination, an air supply duct having openings into a plurality of enclosed zones, dampers for controlling the supply of air into each zone, air operated damper motors in control of the several dampers so connected as to open said dampers on relatively low air pressure within said motors, a thermostat located within each of said zones for maintaining a predetermined temperature therein by maintaining a relatively greater air pressure in its associated damper motor on relatively high zone temperature and by maintaining a relatively lower air pressure therein on relatively low zone temperature, means for supplying heated air to said supply duct, a control air supply line, an air compressor for supplying control air to said supply line, to said thermostats and said damper motors, and thermostatic means influenced by a temperature which varies with the demand for heat in said zones for reducing the control air pressure to thereby open said zone dampers independently of the zone thermostats when heat is not required in said zones to thereby provide ventilation for said zones.

2. In a pneumatically controlled zone air conditioning system, in combination, a plurality of zones to be heated and ventilated, a chamber, duct means connecting said chamber and each of said zones, a fan for forcing air from said chamber to said zones through said duct means, a fresh air duct for admitting outdoor air to said chamber, air heating means in said chamber, a volume damper for controlling the flow of air from said duct means to one of said zones, a pneumatic damper motor for positioning said damper, said damper motor being of the type adapted to open said damper on minimum control air pressure, a zone thermostat for determining the control air pressure in said damper motor, a control air supply line for said damper motor and said thermostat, an air compressor for supplying control air under pressure to said control air supply line, and thermostatic means influenced by a temperature which varies with the demand for heat in said zones for reducing the control air pressure to thereby open said volume damper independently of the zone thermostat when heat is not required in said zone to thereby provide ventilation for said zone.

3. In an air conditioning system, in combination, a plurality of zones to be heated and ventilated, a chamber, heating means for heating the air passing through said chamber, a supply air duct for conducting air from said chamber to said zones, a volume damper for controlling the amount of air passing from said duct to one of said zones, a pneumatic damper motor for positioning said damper, a zone thermostat of the pneumatic type adapted to supply said damper motor with relatively high air pressure on relatively high zone temperature and with relatively low air pressure on relatively low zone temperature, a pneumatic motor for causing said heating means to be relatively more effective on high control air pressure and relatively less effective on low control air pressure, a control air supply line for said thermostat, damper motor and said pneumatic motor, an air compressor for supplying compressed control air to said control air supply line, and thermostatic means influenced by a temperature which varies with the demand for heat in said zones for reducing the control air pressure to thereby open said volume damper independently of the zone theremostat when heat is not required in said zone to thereby provide ventilation for said zone.

4. In an air conditioning system, in combination, a plurality of zones to be heated and ventilated, a chamber, heating means for heating the air passing through said chamber, a supply air duct for conducting air from said chamber to said zones, a volume damper for controlling the amount of air passing from said duct to one of said zones, a pneumatic damper motor for positioning said damper, a zone thermostat of the penumatic type adapted to supply said damper motor with relatively high air pressure on relatively high zone temperature and with relatively low air pressure on relatively low zone temperature, a pneumatic motor for causing said heating means to be relatively more effective on high control air pressure and relatively less effective on low control air pressure, a control air supply line for said thermostat, said damper motor and said pneumatic motor, an air compressor for supplying compressed control air to said thermostat, said damper motor and said pneumatic motor, and thermostatic means influenced by a temperature which varies with the demand for heat in said zones for stopping operation of said compressor to thereby open said volume damper independently of the zone thermostat to thereby provide ventilation for said zone.

5. In an air conditioning system, in combination, a plurality of zones to be heated and ventilated, a chamber, a steam coil for heating the air passing through said chamber, a supply air duct for conducting air from said chamber to said zones, a volume damper for controlling the amount of air passing from said duct to one of said zones, a pneumatic damper motor for positioning said damper, a zone thermostat adapted to supply said damper motor with relatively high air pressure on relatively high zone temperature and with relatively low air pressure on relatively low zone temperature, a pneumatically positionable valve for controlling the supply of steam to said steam coil, a thermostat in said chamber responsive to the temperature of the air leaving said steam coil for supplying said valve with relatively high air pressure on relatively low air temperature and with relatively low air pressure on relatively high air temperature, a thermostat responsive to outdoor air temperature for controlling the setting of said chamber thermostat to demand hotter air on relatively low outdoor temperatures, a control air supply line for said thermostats, said damper motor and said valve, an air compressor for supplying compressed control air to said air supply line, said damper motor and said valve, and thermostatic means influenced by a temperature which varies with the demand for heat in said zones for reducing the control air pressure to thereby open said volume damper independently of the zone thermostat when heat is not required in said zone to thereby provide ventilation for said zone.

6. In an air conditioning system, in combination, a plurality of zones to be heated and ventilated, a chamber, a steam coil for heating the air passing through said chamber, a supply air duct for conducting air from said chamber to said zones, a volume damper for controlling the amount of air passing from said duct to one of said zones, a pneumatic damper motor for positioning said damper, a zone thermostat adapted to supply said damper motor with relatively high air pressure on relatively high zone temperature and with relatively low air pressure on relatively low zone temperature, a pneumatically positionable valve for controlling the supply of steam to said steam coil, a thermostat in said chamber responsive to the temperature of the air leaving said steam coil for supplying said valve with relatively high air pressure on relatively low air temperature and with relatively low air pressure on relatively high air temperature, a thermostat responsive to outdoor air temperature for controlling the setting of said chamber thermostat to demand hotter air on relatively low outdoor temperatures, an air compressor for supplying compressed control air to said thermostats, and thermostatic means influenced by a temperature which varies with the demand for heat in said zones for stopping operation of said compressor to thereby open said volume damper independently of the zone thermostat to thereby provide ventilation for said zone.

7. In a pneumatically controlled air conditioning system, in combination, an air circulating system including an air supply duct, a return air duct, a fresh air duct, a mixing chamber, a steam coil in said mixing chamber, a pipe for supplying steam to said coil, a pneumatically actuated steam valve in said pipe for shutting off the supply of steam at low control air pressure, a fan for supplying conditioned air to said supply air duct, a thermostat in said mixing chamber on the discharge side of said coil for regulating the temperature of air discharged from said coil by adjusting said steam valve, said thermostat also being responsive to outdoor temperature for maintaining a higher discharge air temperature at lower outdoor temperatures, a plurality of zones to be heated and ventilated having openings to said air supply duct, dampers in said openings, air operated motors in control of said dampers adapted to open said dampers at relatively low air pressure, zone thermostats in each zone in control of said damper motors for maintaining each zone at a predetermined temperature, openings from said zones into said return air duct, an air compressor for supplying compressed control air to said thermostats, damper motors, and said steam valve, and a thermostat for stopping operation of said compressor at a predetermined relatively high temperature.

ANTHONY J. HOPPE.